United States Patent [19]

Yoshida et al.

[11] Patent Number: 5,506,409
[45] Date of Patent: Apr. 9, 1996

[54] RADIATION DETECTING DEVICE AND THE MANUFACTURE THEREOF

[75] Inventors: Minoru Yoshida, Hinode; Hiromi Kobayashi, Ryugasaki, both of Japan

[73] Assignee: Hitachi Medical Corporation, Tokyo, Japan

[21] Appl. No.: 247,855

[22] Filed: May 23, 1994

[30] Foreign Application Priority Data

May 27, 1993 [JP] Japan ..................................... 5-126201

[51] Int. Cl.⁶ ............................................... G01T 1/20
[52] U.S. Cl. ..................... 250/368; 250/367; 250/370.11
[58] Field of Search .............................. 250/370.11, 368, 250/367

[56] References Cited

FOREIGN PATENT DOCUMENTS

| | | |
|---|---|---|
| 0129682 | 1/1985 | European Pat. Off. ............... 250/368 |
| 0523783 | 1/1993 | European Pat. Off. . |
| 3813079 | 11/1988 | Germany . |
| 3900245 | 7/1989 | Germany . |
| 2-208591 | 8/1990 | Japan . |
| 2-208592 | 8/1990 | Japan ................................ 250/370.11 |
| 3-94188 | 4/1991 | Japan ................................ 250/370.11 |
| 3-010188 | 6/1991 | Japan . |
| 4-144174 | 5/1992 | Japan . |
| 4-240442 | 8/1992 | Japan . |

*Primary Examiner*—Constantine Hannaher
*Attorney, Agent, or Firm*—Antonelli, Terry, Stout & Kraus

[57] ABSTRACT

A scintillator converts radiations incident thereon into light, which is converted into an electric signal by a photoelectric converter. Formed between the scintillator and the photoelectric converter is a light-transmitting adhesive layer including a plurality of spherical, light-transmitting spacers which each have the same diameter as the thickness of the adhesive layer, whereby the scintillator and the photoelectric converter are bonded to each other with the gap therebetween held being uniform at the same value as the diameter of the spacers.

18 Claims, 3 Drawing Sheets

RADIATION DETECTING DEVICE AND THE MANUFACTURE THEREOF

BACKGROUND OF THE INVENTION

The present invention relates to a radiation detecting device and its manufacturing method, and more specifically to a radiation detecting device suited for combined use with a medical X-ray CT scanner and a method of manufacturing it.

The currently available radiation detecting device used in medical X-ray CT scanners comprises a scintillator—in place of the conventional Xe ionization chamber type detector—that converts incident radiations into light and a photoelectric converter that converts the light from the scintillator into electric signals. These components are securely bonded together by a transparent bonding agent. This detector is generally called a radiation solid-state detector, known for its high S/N ratio (signal to noise ratio).

In more concrete terms, on the surface of a semiconductor substrate on which arrayed photodiodes (photoelectric converters) are formed, scintillators isolated from each other by isolation plates for each corresponding photodiode are arranged via the bonding agent.

With a radiation detecting device of such configuration, however, uniformity of output from each diode is lost because of variations in the scintillator layout orientation with respect to the semiconductor substrate and in the thickness of the transparent bonding agent layer interposed between the scintillator and the semiconductor substrate.

In other words, the linear characteristic of the scintillator (characteristic of sensitivity for a change in the radiation energy spectrum) varies depending on the angle of incidence of the incoming radiation. This characteristic is more pronounced in a polycrystalline sinter scintillator (hereinafter referred to as ceramic scintillator) than in a monocrystalline scintillator.

The bonding agent has not only the function of fixing the scintillators to the semiconductor substrate but also the function of facilitating the introduction of the light produced by the scintillators toward the photodiodes. This requires that both the layout orientation of the scintillators with respect to individual photodiodes and the optical characteristic of the bonding agent be uniform.

The fluid characteristic of the bonding agent, however, makes it difficult for the bonding agent layer to be uniform over the entire area when the scintillators are bonded to the semiconductor substrate by the bonding agent. This in turn causes variations in optical characteristic of the bonding agent corresponding to each photodiode.

SUMMARY OF THE INVENTION

An object of this invention is to provide a radiation detecting device suited for making the thickness of an adhesive layer uniform.

A further object of this invention is to provide a radiation detecting device suited for making the layout orientation of scintillators uniform.

Another object of this invention is to provide a radiation detecting device suited for making the optical characteristic of the adhesive layer uniform.

Still another object of this invention is to provide a radiation detecting device suited for improving the output characteristic of the photoelectric converter.

A radiation detecting device according to the present invention has a scintillator for converting radiations incident thereon into light, a photoelectric converter for converting the converted light into an electric signal, an adhesive layer formed between the scintillator and the photoelectric converter to bond them to each other, and a plurality of spacers provided in the adhesive layer, the spacers being equal to each other in size in the direction of thickness of the adhesive layer and also substantially equal to the thickness of the adhesive layer.

According to another aspect of this invention, an adhesive, and a plurality of spacers of substantially equal sizes mixed in the adhesive, are placed on one of the scintillator and the photoelectric converter, and the scintillator and the photoelectric converter are pressed against each other with the adhesive and spacers sandwiched therebetween so that the scintillator and the photoelectric converter are bonded to each other.

These and other objects and features of this invention will become apparent from the following description with reference to the accompanying drawings.

DESCRIPTION OF THE PREFERRED EMBODIMENTS

Figure 1:
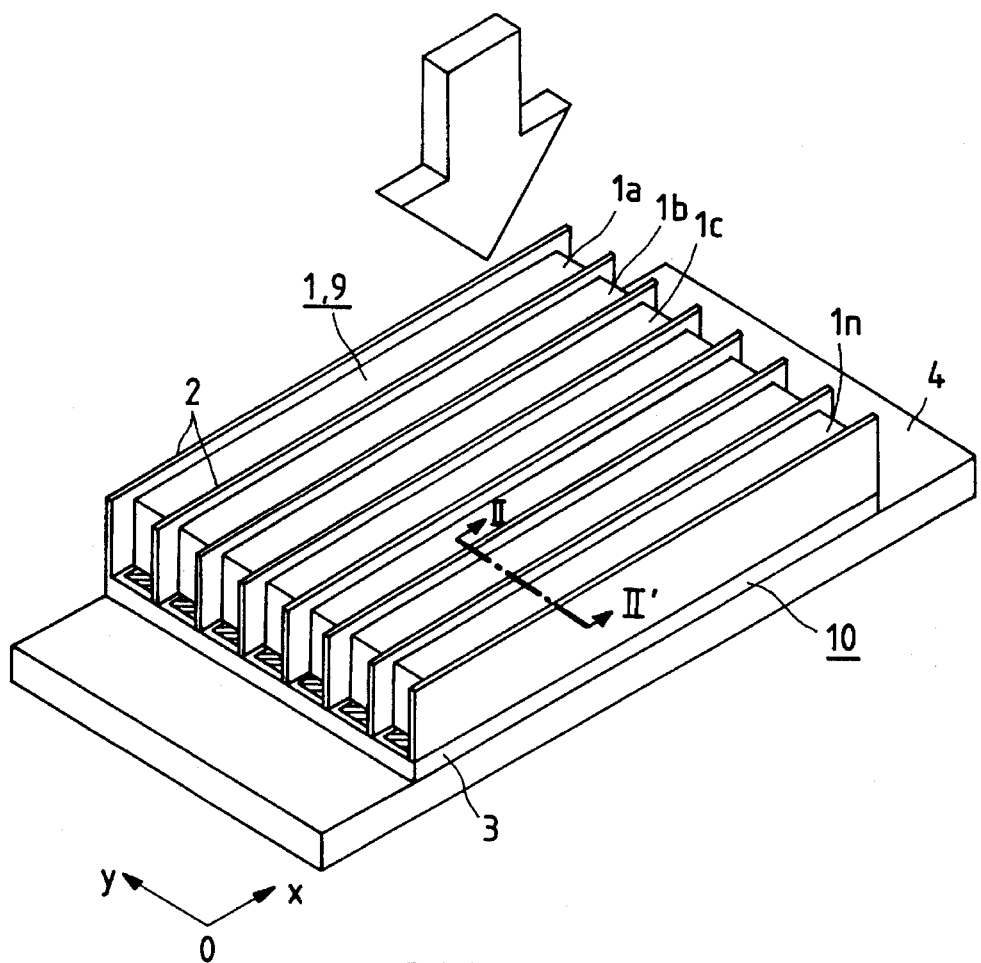
FIG. 1 is a perspective view of a radiation detecting device showing one embodiment according to this invention.
Figure 2:
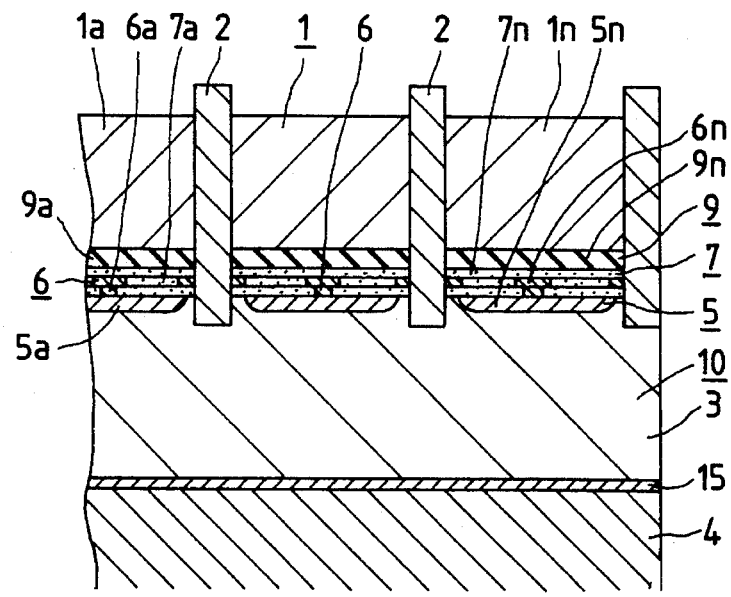
FIG. 2 is a cross section taken along the line II–II' of FIG. 1.
Figure 4:
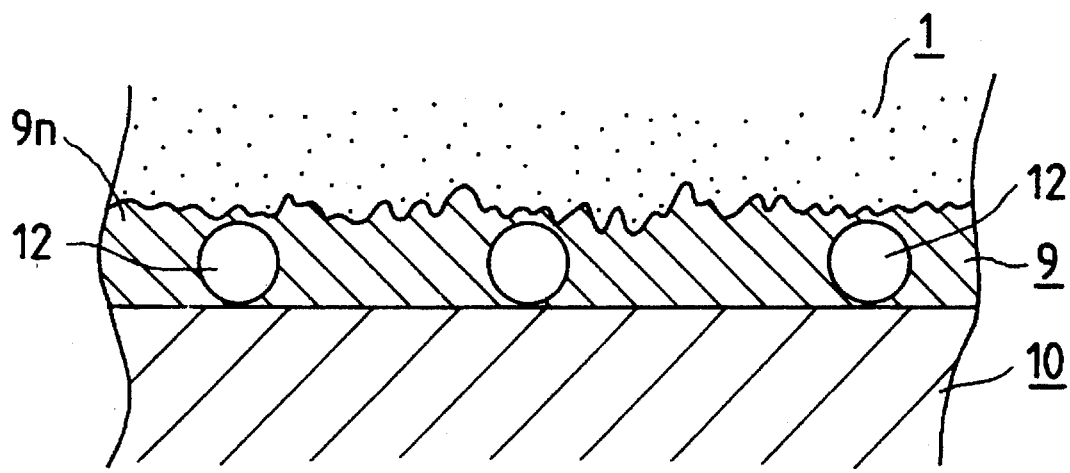
FIG. 4 is a partially enlarged view of FIG. 1.

Referring to FIG. 1, a radiation detecting device forming one embodiment of this invention includes a printed circuit board 4, a photoelectric converter 10 formed on the surface of the printed circuit board 4, and a scintillator 1 formed on the surface of the photoelectric converter 10 with an adhesive layer 9 interposed between. The scintillator 1 comprises a plurality of scintillator elements 1a, 1b, . . . , 1n each having a rectangular cross section, separated by partition plates 2 in the y-direction, and extending in the x-direction so that they are arranged side by side. The adhesive layer 9 comprises a plurality of adhesive layer elements 9a, 9b, . . . , 9n separated by the partition plates 2, as shown in FIG. 2, that are used to bond together the scintillator 1 and the photoelectric converter 10. A plurality of spherical spacers 12 of the same sizes are embedded in each of the adhesive layer elements 9a, 9b, . . . , 9n, as shown in FIG. 4. The photoelectric converter 10, as shown in FIG. 2, includes, from the printed circuit board 4 side, an electrode 15, a substrate 3 formed of an n-type semiconductor, such as silicon, a p-type impurity diffusion layer 5, an electrode 6, and a reflection prevention film or layer 7 made of a silicon oxide film or layer. The impurity diffusion layer 5, the electrode 6 and the reflection prevention layer 7 include a plurality of impurity diffusion layer elements 5a, 5b, ..., 5n, a plurality of electrode elements 6a, 6b, ..., 6n, and a plurality of reflection prevention layer elements 7a, 7b, ..., 7c, respectively. The substrate 3 and the impurity diffusion layer 5 constitute a photodiode.

The scintillator elements 1a, 1b, ..., 1n may be formed of a monocrystal, such as NaI, CsI, CdWO$_4$, ZnWO$_4$ and BGO, or of a ceramic scintillator, such as GD$_2$O$_2$S:Pr, Gd$_2$O$_2$S:Eu, and Gd$_2$O$_3$:Eu. These scintillators are about 1–5 mm thick.

The adhesive layer elements 9a, 9b, ..., 9n have a high level of transparency and a high light-transmission capability and may be made of a resin material, such as acrylics, epoxy or rosin having a refractive index of 1.5 to 2.0. These adhesive layer elements are preferably formed thin. To this end, a reaction diluent may preferably be used to reduce viscosity.

Figure 3:
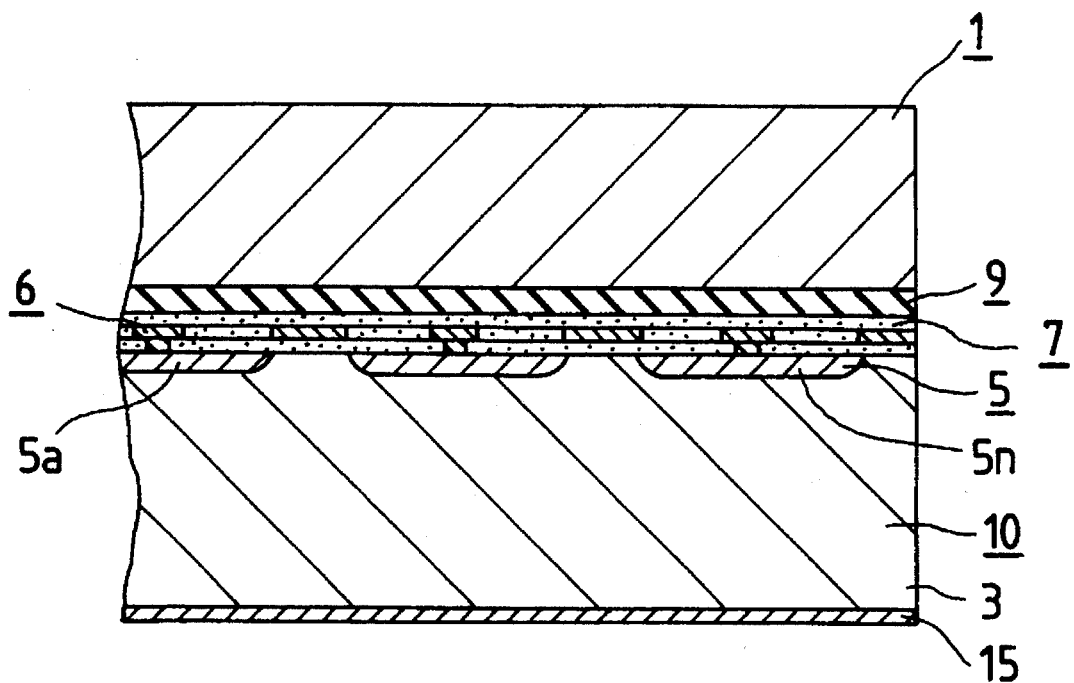
FIG. 3 is a cross section of the essential portions of the radiation detecting device for explaining the manufacturing process of the radiation detecting device according to this invention.

Bonding of the photoelectric converter 10 and the scintillator 1 is done with the scintillator element 1 not yet divided, as shown in FIG. 3. After this, by using a slicer, the scintillator 1 is formed with grooves that reach a part of the photoelectric converter 10. Partition plates 2 are inserted into these grooves to form a structure as shown in FIG. 2.

In bonding the scintillator 1, not yet divided, to the light-electricity converter 10, a bonding agent is dripped onto the surface of one of them and the other is stacked on the adhesive-applied surface. Then, the scintillator 1 and the photoelectric converter 10 are pressed against each other so that the adhesive spreads uniformly.

When an X-ray enters the scintillator 1 from the direction shown in FIG. 1, the scintillator elements 1a, 1b, ..., 1n convert the incident X-ray into light, which then passes through the adhesive layer elements 9a, 9b, ..., 9n and the reflection prevention layer elements 7a, 7b, ..., 7n and strikes the impurity diffusion layer elements 5a, 5b, ..., 5n that form parts of the photodiode. The photodiode produces electric charges according to the amount of the incident light received, causing a current to flow between the electrodes 6 and 15. This current corresponds to the amount of X-rays that have entered the scintillator 1.

As shown in FIG. 4, in each of the adhesive layer elements 9a, 9b, ..., 9n, a plurality of spherical spacers 12 are disposed. When the undivided scintillator 1 and the photoelectric converter 10 are held together under pressure, the adhesive that forms the adhesive layer 9 between them is squeezed out to the periphery of the contact surfaces, so that the gap between the scintillator 1 and the photoelectric converter 10, i.e., the thickness of the adhesive layer elements 9a, 9b, ..., 9n, is determined by the size of the spacer 12. In other words, the bonding agent layers' thickness is equal to the size of the spacer 12.

The spacer 12 may be formed of a cross-linked polymer of high molecular resin with high transparency, such as acrylics, epoxy and divinylbenzene. As a result, the refractive index of the spacer 12 becomes almost equal to that of the adhesive layer elements 9a, 9b, ..., 9n and its hardness is relatively low, preventing a break of the photoelectric converter 10.

An ideal adhesive in which spacers 12 are mixed, for example, contains bisphenol A type epoxy resin (trade name: Epicoat 819), modified amine epoxy resin hardener (trade name: Epomate B002), reactive diluent (trade name: Shellbroc), and spacers of divinylbenzene cross-linked polymer resin (trade name: Micropearl) in the weight ratio of 1.0:0.75:0.25:0.015.

In general, the optimum conditions of the adhesive involve low wavelength selectivity in the luminous wavelength region (400–900 nm) of the scintillator 1, high level of transparency to provide a high light transmission factor, the same refractive index as the spacers 12, which is close to that of the scintillator 1 and the reflection prevention layer 7.

Figure 5:
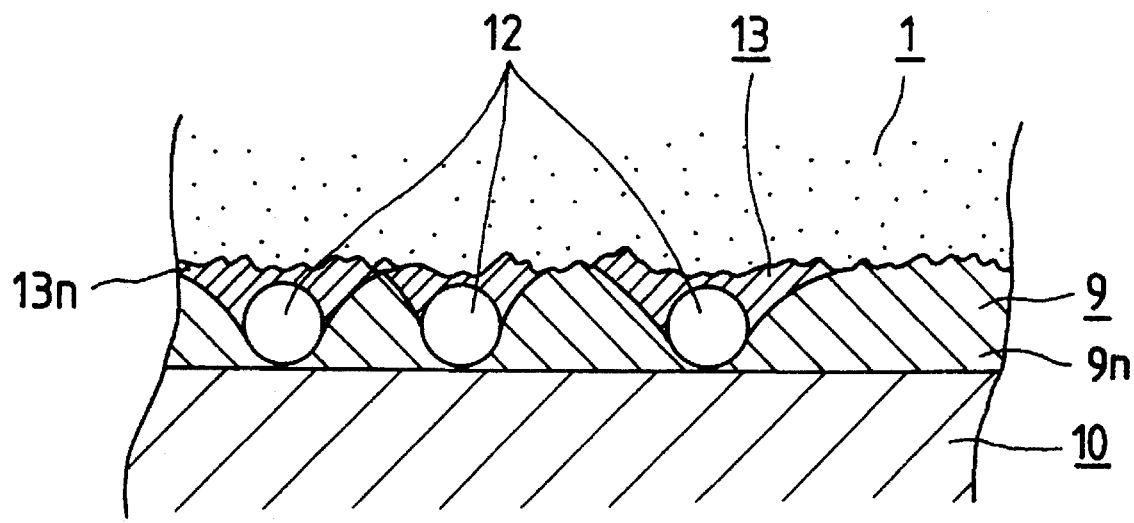
FIG. 5 is a partially enlarged view, corresponding to FIG. 4, of another embodiment of the radiation detecting device according to this invention.

FIG. 5 shows a construction similar to that shown in FIG. 4, except that the adhesive layer 9 made up of adhesive layers 9a, 9b, ..., 9n includes another adhesive layer 13 comprising adhesive layer elements 13a, 13b, ..., 13n. The adhesive layer 13 is designed to fix the spacers 12 to the scintillator 1 in advance so that the spacers 12 are prevented from moving and are evenly distributed.

The adhesive that forms the adhesive layer 13 preferably contains bisphenol A type epoxy resin (trade name: Epicoat 819), modified amine epoxy resin hardener (trade name: Epomate B002), and reactive diluent (trade name: Shellbroc) in the weight ratio of 1.0:0.75:0.25.

The spacers 12 may be fixed to the scintillator 1 in the following manner. The adhesive, such as acrylic, epoxy and rosin resin with high refractive index (n=1.5 to 2.0), is diluted with a diluent (organic solvent such as acetone, toluene or xylene) and is mixed with spacers 12. The diluted adhesive mixed with spacers is applied very thinly to that surface of the scintillator 1 which is to be bonded, either by spraying, printing, roll-coating, spin-coating, or by using a micro dispenser.

The scintillator 1, applied with the spacers 12 as described above, is heated in an electric oven to evaporate the diluent (organic solvent such as acetone, toluene or xylene) mixed in the adhesive layer portion 13 and harden the adhesive. The adhesive hardening is preferably done under the condition of pre-curing. That is, the adhesive is not completely hardened, but rather is pre-cured so that it will be hardened upon reheating. For example, when an epoxy adhesive is used, bisphenol A type epoxy resin (trade name: Epicoat 819), modified amine epoxy resin hardener (trade name: Epomate B002), diluent (toluene), and spherical spacers of vinylbenzene cross-linked polymer resin (trade name: Micropearl) are mixed in the weight ratio of 1:0.5:0.4:0.015. The mixture is sprayed on the scintillator, which is then heated in the electric oven. To achieve pre-curing, it is heated at 60°–80° C. for 10–5 minutes. As shown in FIG. 5, the amount of the adhesive material 13 to be applied should, of course, be such that the thickness of the adhesive layer will not be greater than the diameter of the spacers 12 used.

Figure 6:
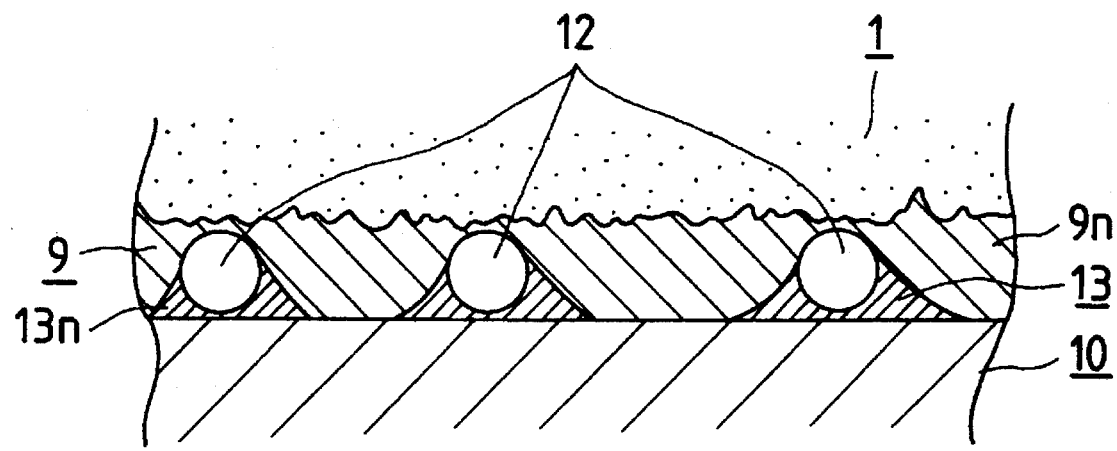
FIG. 6 is a partially enlarged view, corresponding to FIG. 4, of still another embodiment of the radiation detecting device according to this invention.

FIG. 6 shows the case where the spacers are secured to the photoelectric converter 10, not the scintillator, by means of the adhesive layer 13. This case also produces a similar effect to that of FIG. 5.

As described above, in the construction of this embodiment, the adhesive layer 9, which is interposed between the semiconductor substrate 3 and the scintillator 1 to bond them together, is mixed with spacers 12 of the same diameter as the thickness of the adhesive layer portion 9.

Therefore, as the scintillator 1 and the light-electricity converter 10 are pressed against each other with fluid adhesive interposed, the thickness of the adhesive layer 9 is determined by the diameter of the spacers 12.

Thus, the adhesive layer 9 is uniform in thickness over the entire area, keeping uniform the orientations of the bonded scintillator elements 9a, 9b, ..., 9n and the optical characteristic of the adhesive layer 9.

Because the pressure between the scintillator 1 and the photoelectric converter 10 does not concentrate on a particular location, but is distributed according to the number of spacers 12 used, the surface of the photoelectric converter 10 can be prevented from being broken.

While the above embodiment uses spherical spacers 12, it is also possible to use other forms of spacers, such as bar- or pipe-shaped spacers, to achieve a similar objective.

In the above embodiment, on the surface of the semiconductor substrate 3—in which photodiodes are formed in array—there are arranged a plurality of scintillators 1 that are separated from each other by partition plates 2 to correspond to the associated photodiodes, with the adhesive layer 9 interposed between the substrate and the scintillator. This invention can also be applied to other arrangements where, for example, the scintillator is secured to the surface of a single-element photodiode. In this case, when they are arranged side by side, their characteristics (particularly the arrangement orientations of the scintillators and the optical characteristic of the adhesive) can be made uniform.

In summary, with the radiation detecting device according to this invention, it is evident, that the arrangement orientations of the scintillator elements with respect to the photoelectric converter and the optical characteristic of the transparent adhesive used to fix the scintillators can be made uniform.

Since it is obvious that many changes and modifications can be made in the above described details without departing from the nature and spirit of the invention, it is to be understood that the invention is not to be limited to the details described herein.

What is claimed is:

1. A radiation detecting device comprising:
   a scintillator for converting radiation incident thereon into light;
   a photoelectric converter for converting light received from said scintillator into an electric signal;
   an adhesive layer of a first material of low hardness and having a predetermined thickness and formed between the scintillator and the photoelectric converter to bond them to each other; and
   a plurality of spacers provided in the adhesive layer, the spacers being formed of a second material of low hardness, different from the first material and having a refractive index substantially equal to that of the first material, said spacers being substantially equal to each other in size in the direction of the thickness of the adhesive layer and also substantially equal to the thickness of the adhesive layer.

2. A radiation detecting device according to claim 1, wherein the adhesive layer and the spacers are light-transmitting.

3. A radiation detecting device according to claim 2, wherein each of the spacers is spherical.

4. A radiation detecting device according to claim 3, wherein the adhesive layer includes an adhesive layer portion to bond the spacers to one of the scintillator and the photoelectric converter.

5. A radiation detecting device according to claim 2, wherein each of the spacers is of a bar-like shape or pipe-like shape with a circular cross section and the longitudinal direction of each of the spacers is substantially perpendicular to the direction of the thickness of the adhesive layer.

6. A radiation detecting device as claimed in claim 1, wherein the second material is a high molecular resin material.

7. A radiation detecting device comprising:
   a scintillator including a plurality of scintillator elements arranged side by side and a plurality of partition walls to separate the scintillator elements from each other;
   a photoelectric converter;
   adhesive layers of a first material of low hardness and having a predetermined thickness and disposed between the plurality of scintillator elements and the photoelectric converter; and
   a plurality of spacers arranged in each of the adhesive layers, the spacers being formed of a second material of low hardness, different from the first material, and having a refractive index substantially equal to that of the first material, said spacers being substantially equal to each other in size in the direction of the thickness of the adhesive layers and also substantially equal to the thickness of the adhesive layers.

8. A radiation detecting device according to claim 7, wherein the adhesive layers and the spacers are light-transmitting and the photoelectric converter includes a photodiode and reflection prevention layers which are formed on the surface of the photodiode so as to contact the adhesive layers.

9. A radiation detecting device according to claim 8, wherein the spacers are each spherical.

10. A radiation detecting device according to claim 9, wherein the spherical spaces each have a diameter between 5 μm and 20 μm.

11. A radiation detecting device as claimed in claim 1, wherein the second material is a high molecular resin material.

12. A method of manufacturing a radiation detecting device including a scintillator and a photoelectric converter bonded to the scintillator, comprising the steps of:
    placing on the surface of one of the scintillator and the photoelectric converter an adhesive layer formed of a first material of low hardness and a plurality of spacers formed of a second material of low hardness, different from the first material and having a refractive index substantially equal to that of the first material, the spacers being substantially equal in size to each other; and
    pressing the scintillator and the photoelectric converter against each other with the adhesive layer and the spacers interposed therebetween until the adhesive layer and the spacers come into contact with the scintillator and the photoelectric converter, thereby bonding the scintillator and the photoelectric converter to each other.

13. A method of manufacturing a radiation detecting device according to claim 12, wherein the spacers and the adhesive are light-transmitting and the spacers each have a cross-section between 5 μm and 20 μm.

14. A method as claimed in claim 12, wherein the second material is a high molecular resin material.

15. A method of manufacturing a radiation detecting device including a scintillator and a photoelectric converter bonded to the scintillator, comprising the steps of:
    substantially bringing into contact with and fixing to the surface of one of the scintillator and the photoelectric converter a plurality of spherical, light-transmitting spacers of substantially equal sizes to each other by using a first adhesive formed of a first light-transmitting material of low hardness, the spacers formed of a second material of low hardness, different from the first material and having a refractive index substantially equal to that of the first material;
    disposing a second light-transmitting adhesive between the scintillator and the photoelectric converter together with the spacers; and pressing the scintillator and the photoelectric converter against each other to substantially bring the spacers into contact with the other of the scintillator and the photoelectric converter and to thereby bond the scintillator and the photoelectric converter to each other.

16. A method as claimed in claim 15, wherein the second material is a high molecular resin material.

17. A method of manufacturing a radiation detecting device including a scintillator and a photoelectric converter bonded to the scintillator, comprising the steps of:

applying to the surface of one of the scintillator and the photoelectric converter a first adhesive formed of a first, light-transmitting material and a plurality of spherical, light-transmitting spacers, the spacers formed of a second material of low hardness, different from the first material and having a refractive index substantially equal to that of the first material, the spacers being of substantially equal sizes, to fix the spacers to the surface; and pressing the scintillator and the photoelectric converter against each other with a second adhesive interposed therebetween until the spacers come into contact with the scintillator and the photoelectric converter, thereby bonding the scintillator and the photoelectric converter to each other.

18. A method as claimed in claim 17, wherein the second material is a high molecular resin material.

* * * * *